Feb. 24, 1931. A. W. CAPS 1,793,837
PHOTOGRAPHIC APPARATUS
Filed Dec. 3, 1927 6 Sheets-Sheet 1

*Fig. 1*

INVENTOR
Arthur W. Caps
BY
Crumpton & Griffith
his ATTORNEYS

Feb. 24, 1931. A. W. CAPS 1,793,837
PHOTOGRAPHIC APPARATUS
Filed Dec. 3, 1927 6 Sheets-Sheet 2
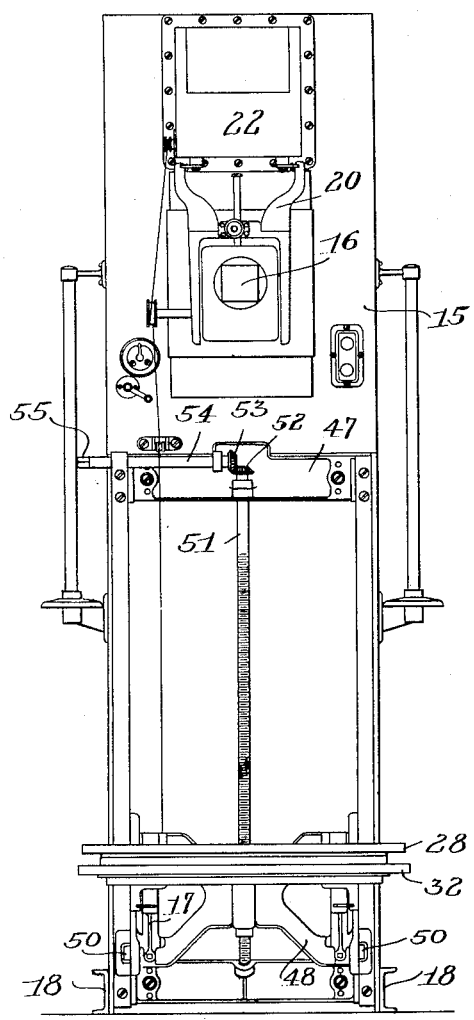
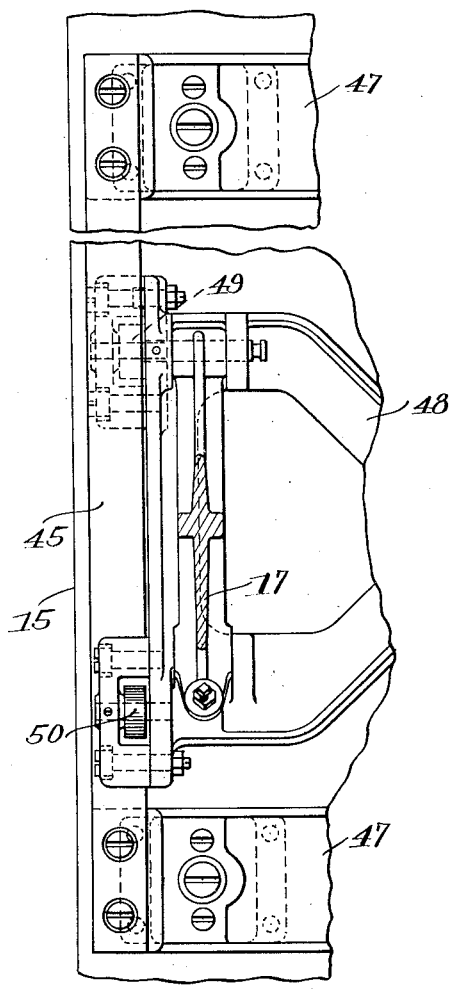
INVENTOR
Arthur W. Caps
BY
his ATTORNEYS

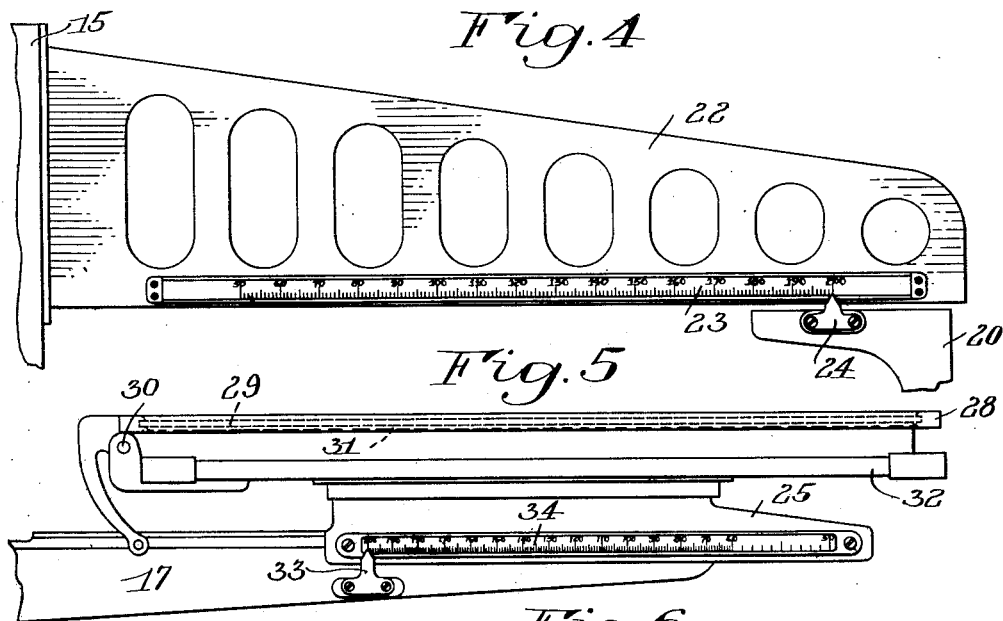
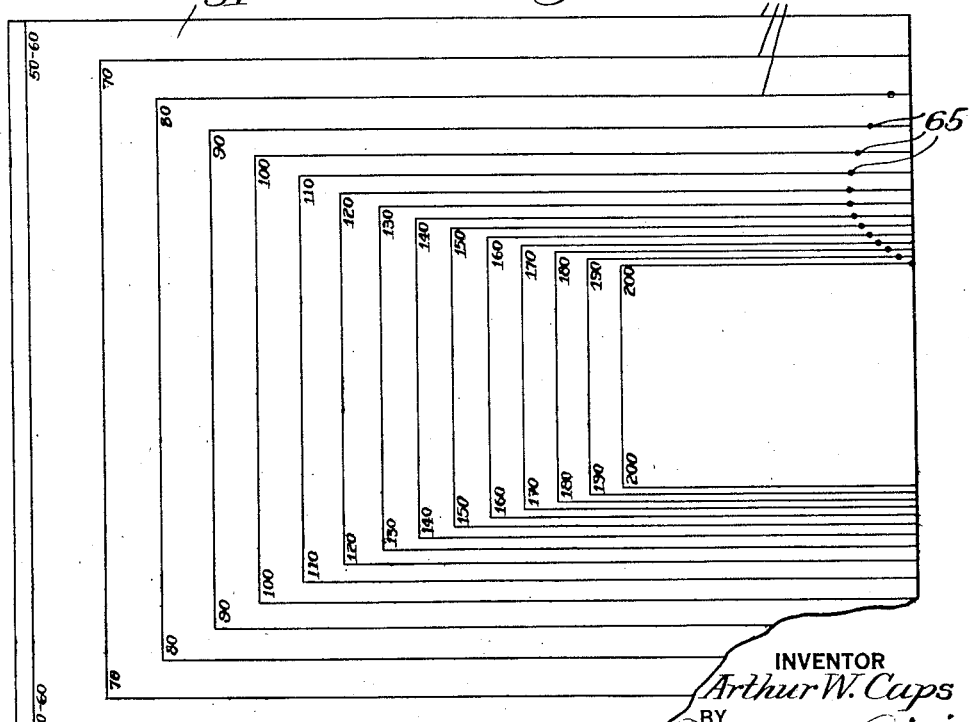

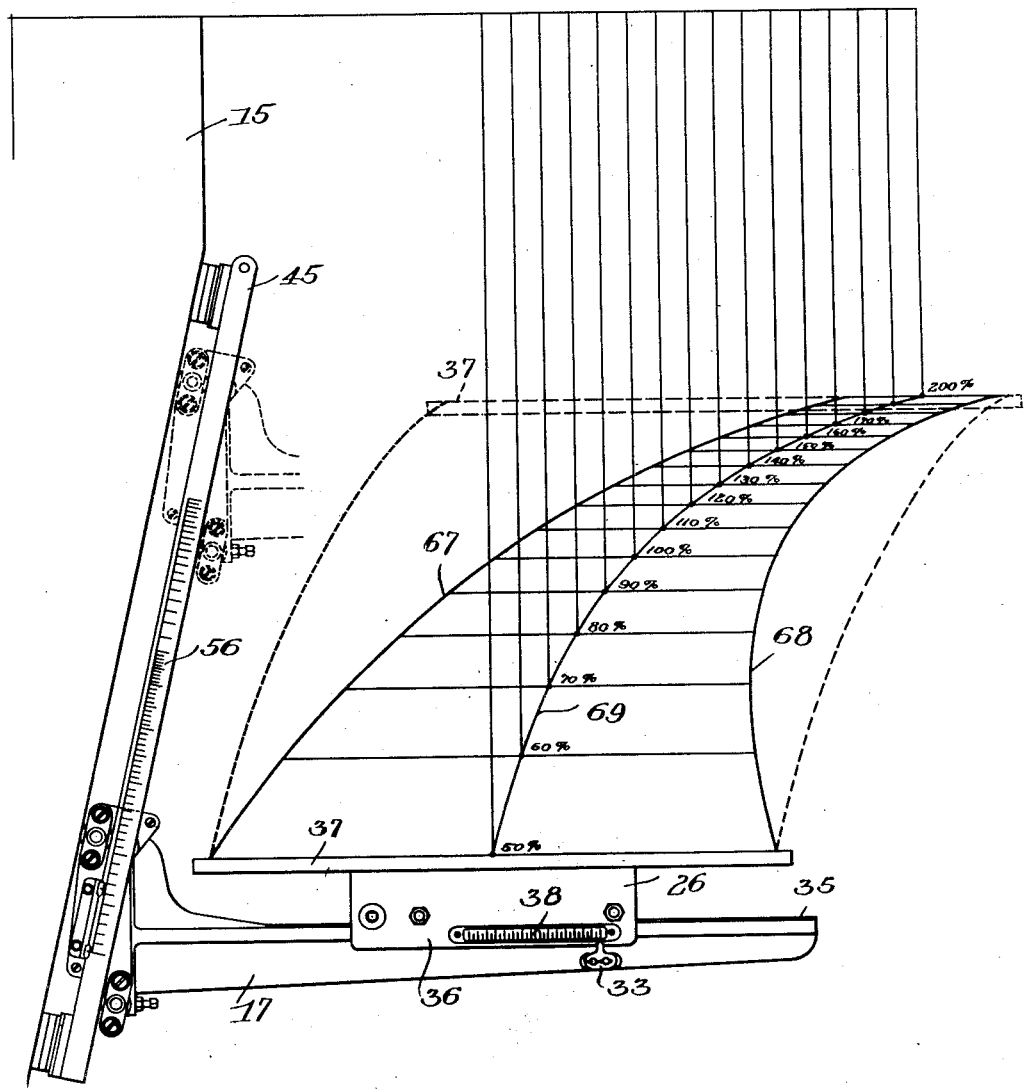

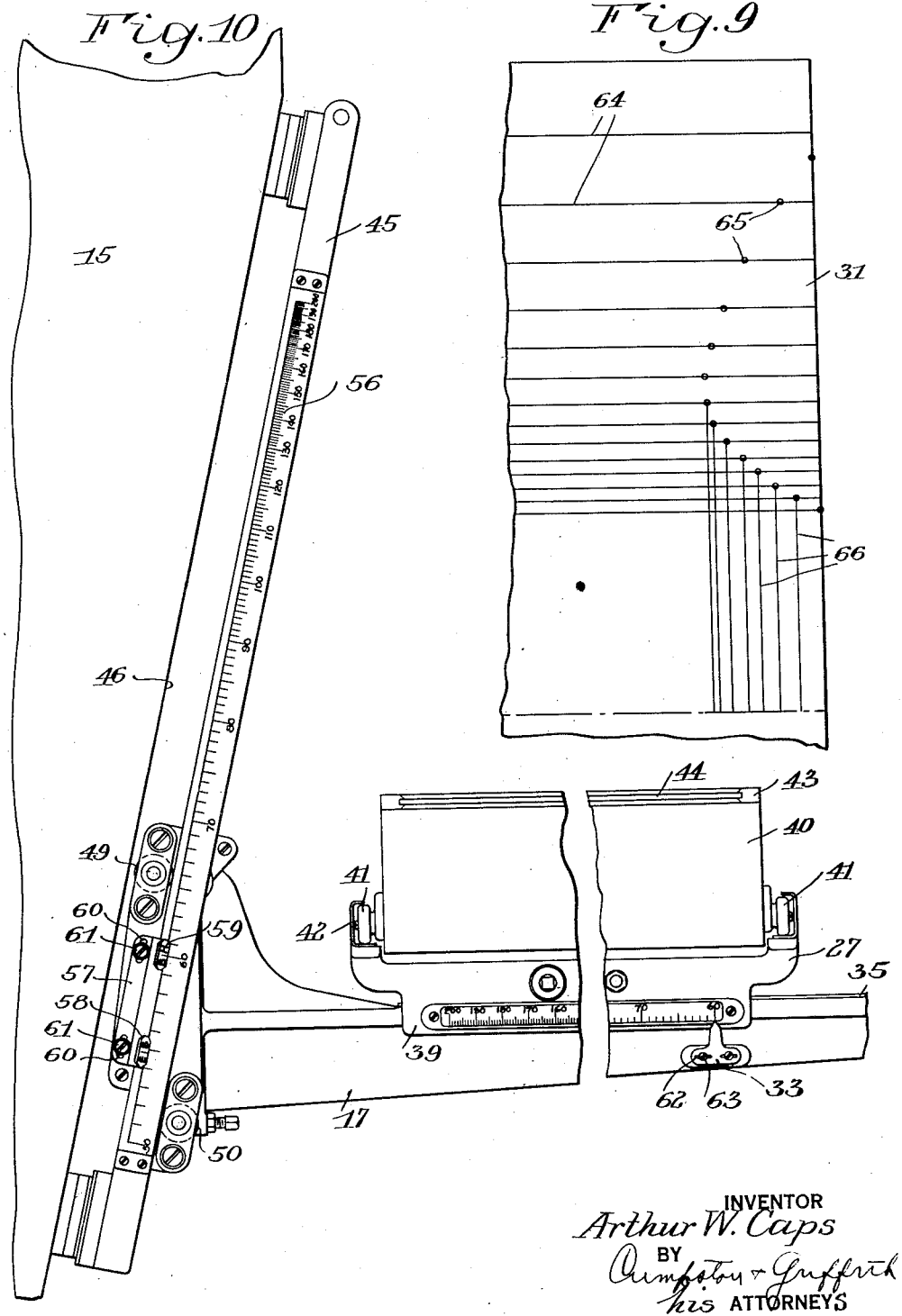

Patented Feb. 24, 1931

1,793,837

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed December 3, 1927   Serial No. 237,401.

The present invention relates to photographic apparatus and more especially to apparatus for making enlarged or reduced photographic copies of documents and like objects, and has for an object the provision of a simple, economical and efficient camera, particularly adaptable to commercial use, which is relatively compact and involves a minimum amount of movement of the necessary moving parts for a maximum range of photographic effects. Another object is the provision of an apparatus of this character in which a miximum range of operating effects is obtained by a lens of relatively short focal length. A further object is the provision of efficient indicating means for enabling an operator to rapidly and accurately position all of the parts of the device in proper coordination for obtaining reproductions of predetermined sized enlargements or reductions of the objects to be copied.

To these and other ends the invention resides in certain improvements and combinations of parts, all as will be hereinafter more fully described, the novel features being pointed out in the claims at the end of the specification.

In the drawings:

Fig. 1 is a side elevation of a device embodying the present invention;

Fig. 2 is a front elevation of the device as shown in Fig. 1;

Fig. 3 is a fragmentary view partly in vertical section taken substantially on the line 3—3 of Fig. 1 showing the parts on a somewhat larger scale;

Fig. 4 is a fragmentary detail view showing the camera lens supporting bracket and the scale associated therewith;

Fig. 5 is a detail view illustrating a portion of the vertically adjustable member for supporting a copyholder of the single sheet type and having a scale associated therewith;

Fig. 6 is a plan view of a chart for use with the copyholder of Fig. 5;

Fig. 7 is a schematic view illustrating a somewhat different form of copyholder from that shown in Fig. 5 and indicating by diagram the position of the copy on the copyholder in the various adjusted positions of the latter;

Fig. 9 is an enlarged fragmentary view of the chart illustrating the means for indicating the proper position of the forward edge of the copy, and Fig. 10 is a detail view in side elevation illustrating the use of the vertically adjustable support combined with a bookholder and showing scales for indicating the proper adjustment of the parts.

Similar reference numerals throughout the several views indicate the same parts.

Figure 8:
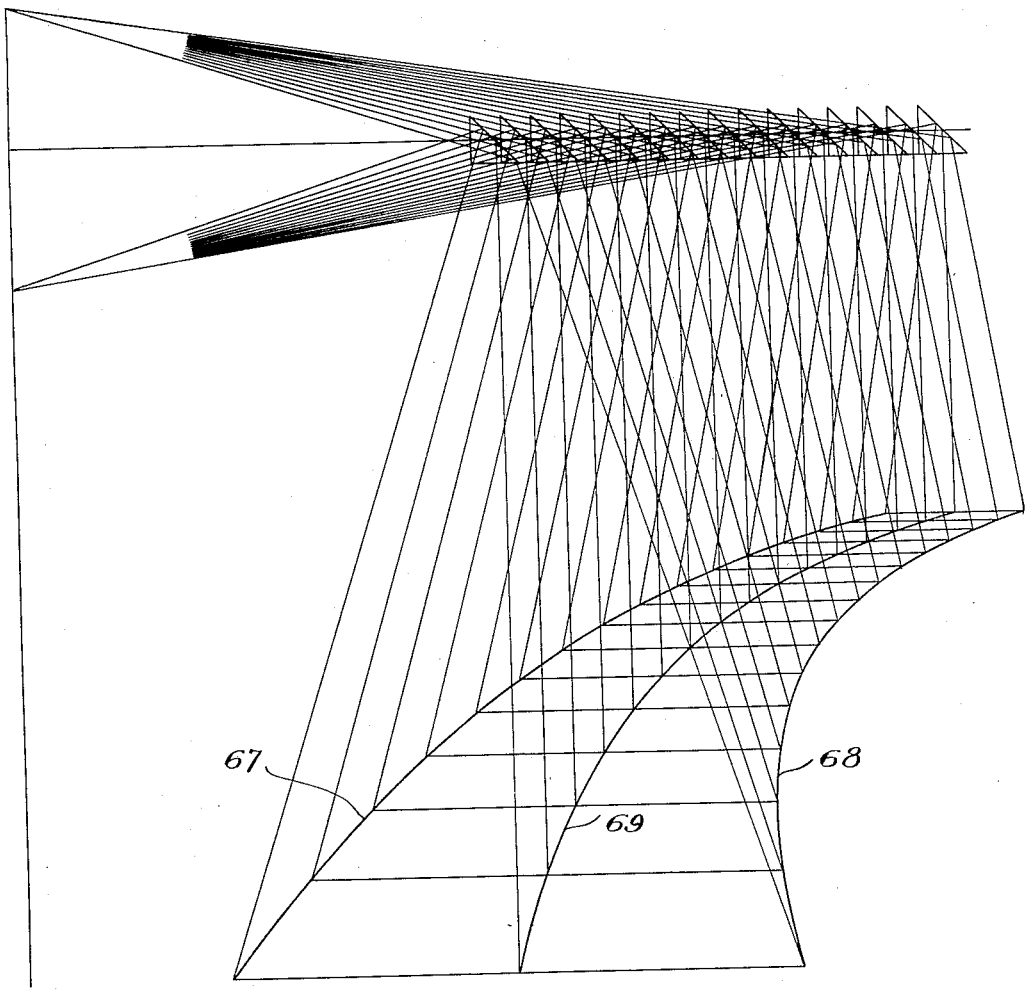
Fig. 8 is a diagrammatic view illustrating the relative position of the copyholder and the camera lens system in their various adjusted positions.

The present embodiment of the invention provides an efficient and compact arrangement of parts utilizing a lens therewith of relatively short focal length whereby the above objects are attained. In a general way the present invention, as disclosed, is embodied in a photographic apparatus having a support for sensitized material, an adjustable lens system and an adjustable copyholder, with suitable means in conjunction therewith for indicating when the parts are in the proper adjustment and focus for producing prints of a desired size with reference to the copy.

The present application is in part a continuation of my copending application, Serial No. 38,844, filed June 22, 1925.

Certain features disclosed but not claimed in the present application are claimed in my copending application for photographic apparatus, Serial No. 243,082, filed Dec. 28, 1927.

Referring more particularly to the drawings, there is shown at 15, in Fig. 1, a casing on which is adjustably mounted a lens system 16, and a vertically adjustable support or bracket 17 beneath the lens system for holding the document or other object to be copied.

The casing 15 of the device may have various forms, but in the present instance is in the form of an upstanding light-proof box supported on a suitable base frame 18. On the interior of the box and adjacent its upper end is suitably supported a holding means 19 for the sensitized material. The holding means 19 may be of any suitable form but is preferably constructed in a manner similar to that shown in my co-pending application, Serial No. 38,844, filed June 22, 1925. In a general way the holding means 19 comprises a frame having means at the upper end for holding a roll of sensitized material and a mask for guiding and holding the material in a flat condition for exposure of definite areas thereof, combined with means at the lower end for severing the exposed prints from the strip.

The lens system 16, in the present instance, preferably comprises a mirror means such as a total reflecting prism and a lens. The prism serves to bend vertical rays from the object to be copied and direct them horizontally through the lens and onto the sensitized material in a manner which is well understood by persons skilled in the art. Suitable provision is made for relative focusing adjustment between the lens and the support 19 for the sensitized material. In the present embodiment the lens is movable and the support 19 is stationary, the lens being mounted on a slide 20 which is movable along a forwardly projecting bracket 22 secured to the front face of the casing 15.

Means are provided for indicating the relative adjustment of the lens with reference to the support for the sensitized material. For this purpose a scale 23 having graduations thereon is supported on the bracket member 22 and an indicator pointer 24 is supported on the slide 20 for cooperation with the scale 23. The purpose of the scale 23 will be explained more in detail as the description proceeds.

The support or bracket 17 is adapted to carry copy holding means of any one of several forms, depending upon the class of work to be photographed, such for example as a copyholder of the spring back type as shown at 25 in Fig. 1, or a copy holder, hereinafter termed the "engineering board", shown at 26 in Fig. 7, or a book holder such as shown at 27 in Fig. 10.

The spring back copy-holder 25 is preferably of the type shown in my companion application, Serial No. 237,402, filed December 3, 1927, and generally comprises a cover frame 28 in which is mounted a transparent glass plate 29. The frame 28 is pivotally mounted at its rear edge on a horizontal axis as at 30 to swing downwardly into contact with a copy positioned on a chart 31 suitably supported on the frame 32 of the copyholder.

Means are provided for indicating the co-ordinate positions of the copy-holder 25 upon the support 17 with reference to the other parts of the apparatus. For this purpose there is provided in the present embodiment an indicator pointer 33 on the support 17 which traverses a scale 34 on the copy-holder 25. The support 17 is preferably provided with guides in the form of tracks 35 upon which the copy-holders will be forwardly or rearwardly movable as by means of suitable cooperating guide slots, not shown.

The engineering board 26 shown in Fig. 7 is of a somewhat different form from that shown in Figs. 1 and 5 and has a base 36 movably mounted along the tracks 35 which supports a board 37, preferably somewhat larger than the frame 32 of the copyholder 25, on which the chart 31 may be placed. As in the case of the copy-holder 25, the engineering board 26 is preferably provided with a scale as shown at 38 for cooperation with the indicator pointer 33 on the support 17.

The book-holder 27 has a base portion 39 mounted to slide forwardly and rearwardly on the tracks 35 as described in connection with the copy-holders 25 and 26. The bookholder is preferably of the type described in my co-pending application, Serial No. 162,257, filed Jan. 20, 1927, and comprises a box portion 40 having wheels 41 mounted in tracks 42, which are positioned transversely of the tracks 35 on the support 17. The box portion 40 is provided in its interior with suitable means for holding a book and has a displaceable cover 43 having a glass plate 44 therein adapted to rest against the open face of a book on the book-holder.

The support 17, as previously stated, is vertically adjustable relatively to the lens system 16. Various means may be employed for mounting and guiding the support 17 for vertical movement, but in the present instance there is provided a pair of guide tracks 45 suitably secured at their ends to the front face of the casing 15. While the tracks 45 can be either curved or straight and can be disposed vertically or inclined, in the present instance they are preferably inclined downwardly and rearwardly from their upper ends and for this purpose the casing 15 has an inwardly inclined or offset face 46. The position of tracks 45 at an inclination is preferable in the present form of the device for the reason that this arrangement gives a more compact structure and permits a maximum range of operation of the camera with a minimum focal length of the lens.

Another advantage in making track 45 inclined is that it thereby increases the effective horizontal extension of the support or bracket 17 thus permitting the use of a relatively short bracket which is more rigid and consequently tends to eliminate any undesirable vibration of the copy-holder which would lower the quality of the reproduction.

The tracks 45 preferably comprise channel members which are secured at their upper and lower ends to brackets 47 on the front face of the casing 15. The carriage portion 48 of the support 17 is provided at each side with an upper roller 49 bearing on one side of each track 45 and a lower roller 50 bearing on the opposite side thereof. Suitable means are provided for adjusting the support 17 upwardly and downwardly along the tracks 45. In the present embodiment the carriage portion 48 of the table is provided with a threaded nut, not shown, into which a threaded shaft 51 is engaged. The shaft 51 is journalled adjacent its ends on the bracket members 47 and is provided at its upper end with a bevelled gear 52 with which another bevelled gear 53 on the shaft 54 is adapted to mesh. The shaft 54 is suitably provided with a squared end 55 on to which a crank of usual form may be applied for rotating the screw threaded shaft 51 to raise and lower the table 17.

Suitable means are provided for indicating the relative vertical positioning of the copyholder on support 17 with reference to the lens system. For this purpose there is provided a graduated scale 56 preferably, although not necessarily, disposed on one of the tracks 45 and along which a suitable indicator member 57 on the table 17 is adapted to traverse. Referring to Fig. 10, the indicator 57 is provided with two reference marks for selective use, depending upon whether the copy-holder 25 or engineering board 26 is used or whether the book holder 27 is used. The mark designated at 58 and bearing the letters EB (being the abbreviation for "engineering board") is placed on the lower part of the indicator member 57 and is the reference mark for the copy-holder 25 and engineering board 26. The reference mark designated at 59 bearing the letters BH is positioned at the upper end of the indicator member 57 and is used only when the bookholder 27 is in position on the table 17.

By comparison of Figs. 1 and 10, it will be seen that the upper surface of the bookholder 27 is disposed at a greater distance from the track 35 on the support 17 than the top of the copy-holder 25. The difference in height between the position of the copy in the book-holder and the position of the copy on the copy-holder is represented by the distance between the EB mark and the BH mark.

For the purpose of providing for an adjustment of the indicator member 57 so as to bring the reference lines thereon to the proper position relatively to the copy, there is provided in the present instance a pair of slots 60 adjacent the ends of the member 57 for the accommodation of machine screws 61 threaded into the carriage portion 48 of the table 17 and providing for the relative shifting movement of the member 57 on the carriage so that it may be shifted and secured in the proper position by means of the screws 61. In a like manner, the indicator pointer 33 on the table 17 may be shifted longitudinally thereof and secured in correct position by means of slots 62 and machine screws 63.

While the copy to be photographed can be suitably positioned on the copyholder by the measurement or by the operator's observing when the copy is in proper position relatively to the optical cone, in the present instance there is provided indicating means for enabling the operator to correctly position the copy without directly observing its position relative to the optical cone. For this purpose separate charts having indication lines thereon are used for the copyholder, the engineering board and the book-holder. Since the principle is substantially the same for each chart, only the one adapted to be used with the copyholder has been shown. Referring to Figs. 6 and 9, the chart 31 is shown as provided with a plurality of indication marks or lines 64 which are preferably in the form of rectangular figures symmetrically disposed one within the other. The innermost rectangle is designated with the number 200 and the succeeding larger rectangles are designated with the numbers 190, 180, 170, etc. corresponding to the degree or percentage of the enlargement or reduction of the photograph. The last or outermost rectangle is designated 50—60 for a purpose which will presently be explained. Thus if the operator desires an enlargement of a copy to twice its actual size, the copy will be placed with its upper or rear edge on the upper or rear line of the "200" rectangle, preferably symmetrically disposed with reference to the center of the upper line. The operator will then adjust the other parts of the apparatus so that the pointers 24, 33 and the EB pointer (in case the copyholders 25 and 26 are used) are opposite the "200" marks on their corresponding scales. The parts will then be substantially in the position as illustrated in Fig. 1 of the drawings. In this position the operator is assured without further testing or focusing the lens system that the camera is in proper focus and the copy is at the proper distance and in the correct position to make a photograph twice the size of the copy.

In each case the operator places the upper or rear edge of the object on the rear line of the rectangle corresponding to the percentage of enlargement or reduction which he wishes to obtain. When the object is so placed and the parts are all in corresponding adjustment the operator knows that the edge of the image of the object will be projected on the sensitized material closely adjacent the lower edge of the exposed area thereof. Thus if for any reason the operator desires to make an enlargement of a document which is not large enough to extend the entire length of a given rectangle, he can mask off the remainder of the space by using black felt or velvet so that no exposure will be made on the corresponding upper portion of the exposed area of the print paper and by a simple calculation the operator can ascertain how far he should move the print paper down to remove the exposed portion thereof out of range of the next exposure.

Means are provided on the chart 31 for indicating the maximum downward or forward extension of the lower edge of the copy in order to indicate to the operator whether the entire copy may be reproduced at the desired enlargement. For this purpose, there are provided suitable indicating marks 65 on the lines 64 from which suitable horizontal lines 66 may be drawn if desired (see Fig. 9). Let it be supposed that the operator desires to obtain a photograph of a document which is one and one half times the size of such document, but he is not sure that the long dimension of the copy is short enough to fit within the contour of the mask used with the sensitized material. He will then place the document with its upper edge on the rear or upper line of the 150% rectangle then if the front or lower edge of the document extends to a point below the indicator mark 65 or the horizontal line 66 corresponding to the 150 rectangle, it will be thus apparent to him that it will not bear so great an enlargement and consequently he will place it on one of the other lines, such as 140 or 130, so that its lower end does not fall below the corresponding marks 65 for those rectangles.

In the preferred form of the invention, it has been found desirable to limit the range of the apparatus to take photographs from one-half size to a double enlargement of the copy, although these limits obviously may be extended in either direction. After determining the limits to which the apparatus is desired to operate, the range of the lens movement toward and away from the sensitized material holder can be readily computed. In the present instance the distance which the lens moves has been divided into fifteen equal parts which have been designated on the scale 23 with indicating numerals from 50 to 200. After selecting the desired unit of movement for the lens the next step is to determine the corresponding amounts of downward movement of the copyholder which are necessary to obtain correctly focused prints. These amounts may be readily calculated by the usual formula:

$$\frac{do}{di} = \frac{O}{I}$$

in which "$do$" and "$di$" represent respectively the distance of the object and the image from the lens, and "$O$" and "$I$" represent respectively the sizes of the object and the image, or these amounts may be determined by empirical methods. In the present instance, since the track 45 is inclined, the scale 56 has been graduated in amounts which correspond to the necessary vertical movements of the copyholder support 17. The graduations of the scale 56, therefore, are equal to the quotient of the vertical distance which the support must be moved divided by the cosine of the angle which the track 45 makes with the vertical. It will be noted that when the copyholder support 17 is moved along the track 45 to the correct vertical adjustment there will also be a horizontal movement of less extent.

The line designated 67 in Figs. 7 and 8 represents the path of travel of the rear edge of the copy in its various positions so that it is apparent that the copyholder or bookholder, whichever is used, must be adjusted horizontally each time the position of the lens is altered. The curved lines 68 and 69 in Figs. 7 and 8 designate respectively the paths of the centers of the different areas on the copyholder due to the various focusing adjustments and the maximum forward position to which an object can extend at a corresponding adjustment and with a given size of area of sensitized material.

Numerous methods may be employed for determining the correct positions of the copy on the copy holder for the various adjusted positions thereof, and while it is within the scope of the invention to utilize either a single scale or a chart for this purpose, it is preferable for the sake of compactness of parts and convenience of construction and operation to so coordinate the scales and the chart to obtain a maximum range of the apparatus with a minimum size of parts and a minimum extent of movement thereof. To this end a certain convenient unit is selected for the scale on the copy holder and the scale is graduated uniformly in such unit. Having established the sizes of graduations for the lens scale (23) and the scale for the copy board support (56) and selected a convenient unit for the copy board scale (34), the next step is to coordinate the spacing of the rectangles on the chart (31) with the scales so that the rear edge of the document or copy will follow the curved path 67 in the various adjusted positions of the apparatus.

Referring particularly to Figs. 1, 5 and 6 showing the spring back copyholder and the chart for use therewith, it will be seen that when the device is adjusted to make enlargements of twice actual size the copyholder 25 is adjusted to an extreme outward or forward position on the support 17. Now if the operator desires to lessen this enlargement by 10%, the lens is adjusted rearwardly, the support 17 is adjusted downwardly, and the copyholder is moved rearwardly, each to its 190 mark. The distance between the 200 and the 190 marks on the chart 31 represents the total distance which the edge of the document must be moved rearwardly minus the sum of the size of the unit on scale 34 and the horizontal component of movement of the support 17 due to the rearward inclination of the track 45. Thus if the edge of the document must be moved rearwardly 3.1 inches in order to bring it to the proper position, and the horizontal component of movement of the support due to the inclined track is .546 inches and the graduations on scale 34 are .987 inches, the spacing of the lines on the chart for that position of the copyholder would be $$3.1-(.546+.987)=1.567,$$

that is, 1.567 inches.

It will be noted that the last line on the chart 31 is designated 50—60 and the distance between the 50 and 60 marks on the scale 34 is wider than the distance between any two of the other marks. This is explained as follows. The copyholder 25 in the present disclosure, is somewhat smaller than would be required for the maximum sized print which it is possible to obtain on the area of the sensitized material exposed in the present instance. As a matter of practice, if a half-sized copy of a large-sized document is desired, the engineering board 26 would be used so that the copyholder 25 would be used for the larger sizes (50% down to 60%) when copies of less than full sized are to be photographed. In such a case a part of the face of the copy board not covered by the copy would be suitably covered by a piece of black felt or velvet so as to prevent exposure of the upper portion of the sensitized material on the support 19. Since the same line is used on the chart for both 60% and 50% reductions, it will be apparent that when a 50% reduction is to be obtained, the copyholder must be moved rearwardly a greater distance than it moves going from the 70% to 60% reduction to compensate for the fact that the copy is not placed in any different position on the chart. It will be further noted from Fig. 6 that the indicating marks 65 do not appear on the 70 and 50—60 lines. The reason for this is that the size of the copy board preferably utilized in this form of the invention, is not large enough to make reductions of less than 80% of the maximum sized copy. However, as stated above, the copyholder 25 would, in practice, only be used in making 70 to 50% reductions of sheets that are approximately one-half to two-thirds of the maximum size.

The engineering board, as shown in Fig. 7, is preferably large enough to hold maximum sized copy thereon for reduction to one-half size. The chart for this board will be, in principle, similar to the chart 31, the lines, however, will have a somewhat different spacing thereon due to the fact that a different size of unit or division on scale 38 is used. In this chart the 50 and 60 lines are made separate since the size of the board makes it possible to place the copy at the proper rear position thereon.

The bookholder, as shown in Fig. 10, in its practical form, is made somewhat shorter from front to rear than the copyholder 25. Therefore, the chart for this form would be correspondingly smaller than the chart 31 and the 80% line on such chart would have to be used as reference line for reductions of 70 and 60.

When the copy is in correct position on the chart and the parts are adjusted to the desired relation, the operator may manipulate the usual shutter mechanism by a convenient foot pedal 70 which is connected to the shutter mechanism by a suitable cable 71.

The operation of the apparatus has been substantially outlined above, but a brief résumé will be given. In using the device, it is frequently desirable to photograph a large number of copies or subjects of miscellaneous sizes and have the prints thereof at a uniform size so that they can be conveniently bound in book form. The operator will select a copy document, which it is desired to make a print of and place it upon the chart 31 approximately on the line which his judgment tells him the copy should be placed. Assuming that he places the copy on the upper line of the 160 rectangle, he will then inspect the edges of the copy to see whether or not it overlaps the side lines of the rectangle. In case it overlaps the sides of 160, he will move it up to the horizontal line of the 150 rectangle and if the edges of the copy do not exactly register with the side lines of the 150 rectangle, he will move the copy until it is symmetrically disposed with reference to the center line of this rectangle. After thus positioning the copy, if the lower edge of the same does not extend below the reference mark 65 for the 150 rectangle, he knows that the copy will bear an enlargement of 150% or one and one half times its actual size and will fit within the contour of the exposed area of sensitized sheet which he is using, and he, therefore, makes the exposure in the usual manner. Succeeding copies will be treated in a corresponding manner so that the prints taken, will all be of uniform size and the pictures or diagrams thereon will be of maximum size permissible for a given size of print.

According to another method of using the device the operator may have a number of documents of substantially uniform size which he desires to print on a reduced scale. The documents for example, may be approximately 11½" x 16" and the operator is using a mask for the sensitized material which gives an exposure of 8½" x 13" thus requiring a reduction of print to approximately 80% of actual size. After copying a number of such documents the operator may find that it is desirable to incorporate a print of a larger sized subject, such as a map or plat, in with the other prints and he wishes to make sure that the photograph of the map is reduced to a size to fit within the mask being used. Assuming that the map has dimensions of approximately 14″ x 20″ the operator will find by computation that the map should be reduced to approximately 60% actual size in order to fit within the 8½″ x 13″ mask. The apparatus will then be adjusted so that the indicator pointers are opposite the 60% mark on their respective scales, the map is properly centered with respect to the optical axis and the exposure is made. The operator thus knows that the map will be reduced to the size of the rest of the prints being turned out. After the map has been photographed the operator will return the apparatus to the 80% adjustment and will continue as above with the 11½″ x 16″ documents.

It will be seen from the foregoing description that the present invention affords a highly efficient and compact photographic apparatus having a relatively large range of operative effects, but at the same time utilizing a lens with a relatively short focal length. The apparatus furthermore has the advantages of speed and accuracy of adjustment, economy of sensitized paper and permits the operator to make enlargements or reductions bearing any desired ratio to the object being copied.

I claim as my invention:

1. In photographic apparatus, the combination of a holding means for sensitized material, a camera lens movable toward and from said holding means, a copyholder disposed laterally of the axis of said lens, means for bending rays from objects on said copyholder and directing them through said lens onto the sensitized material, a copyholder support, guiding means for said support inclined relatively to the plane of said lens, means for moving said copyholder support along said inclined guiding means and in parallelism with the axis of said lens, and means for moving said copyholder on its support parallel to the lens axis, part of said movement being due to the movement of the copyholder support along said inclined guiding means.

2. In photographic apparatus, the combination of a holding means for sensitized material, a camera lens having a focusing movement toward and from said holding means, a copyholder disposed laterally of the axis of said lens, means for bending rays from objects on said copyholder and directing them through said lens onto the sensitized material, a copyholder support, and guiding means for said copyholder support inclined relatively to the plane of said lens and upon which said copyholder support is movable in parallelism to the axis of said lens, said copyholder being movable on said support parallel with the lens axis to compensate for the shifting of the centers of different areas on the copyholder due to the aforesaid focusing movements of said lens for a desired degree of enlargement or reduction.

3. In photographic apparatus, the combination of a holding means for sensitized material, a camera lens having a focusing movement toward and from said holding means, a copyholder disposed laterally of the axis of said lens, means for bending rays from objects on said copyholder and directing them through said lens onto the sensitized material, a copyholder support, guiding means for said copyholder support inclined relatively to the plane of said lens and upon which said copyholder support is movable in parallelism to the axis of said lens, said copyholder being movable on said support parallel with the lens axis to compensate for the shifting of the centers of different areas on the copyholder due to the aforesaid focusing movements of said lens for a desired degree of enlargement or reduction, and means for indicating when the parts are in focus and in correct adjustment for obtaining photographs of definite proportionate ratios to the object to be copied.

4. In photographic apparatus, the combination of a holding means for sensitized material, a camera lens movable toward and from said holding means, a copyholder support adjustable in parallelism with the axis of said lens toward and from the same, said copyholder support being adapted to alternately support a copyholder and a bookholder of different individual heights for movement thereon parallel to the lens axis, a graduated scale associated with said copyholder support for indicating when the parts are in proper focusing adjustment, and an indicator member cooperable with said scale and having separate reference marks thereon for the copyholder and for the bookholder, said reference marks being spaced apart a distance equal to the difference in height of the copyholder and bookholder.

5. In photographic apparatus, in combination, a holding means for sensitized material, a camera lens having focusing movement toward and from said holding means, a copyholder disposed laterally of the axis of said lens, means for bending rays from objects on said copyholder and directing them through said lens onto the sensitized material, a copyholder support, guiding means for said support inclined relatively to the plane of said lens and upon which said support is movable in parallelism to the axis of said lens, said copyholder being movable on said support parallel with the lens axis, a scale associated with the copyholder and its support for indicating the position of the copyholder thereon, a second scale associated with said support for indicating when said support is in correct position on said inclined guiding means, and marks on said copyholder for indicating the correct position of the rear edge of an object thereon, the marks on said copyholder being so correlated to said scales as to insure that said marks, for each corresponding adjustment of the parts, will determine the maximum rearward extent of the rear edge of the object permissible for the area of sensitized material exposed on its holding means.

6. In photographic apparatus, the combination of a camera lens, a holding means for sensitized material positioned in the focal plane thereof, means for adjusting said lens relatively to said holding means, a copyholder disposed laterally of the axis of the lens, means for bending rays from objects on said copyholder and directing them through said lens onto the sensitized material, a copyholder support movable in parallelism with and toward and from said lens, means for adjusting said copyholder on said support parallel to the lens axis, graduated scales for respectively indicating relative positions of said copyholder support with respect to said lens axis and said copyholder with respect to said support, a plurality of spaced indicating marks on said copyholder for determining the correct position of a document thereon, said marks and the graduations on said copyholder scale being so coordinated for each corresponding adjustment of the parts, to produce enlarged or reduced photographs, that the image of the rear edge of the document will be in all cases directed closely adjacent the lower edge of the exposed area of the sensitized material.

7. In photographic apparatus, the combination of a camera lens, a holding means for sensitized material positioned in the focal plane thereof, means for adjusting said lens relatively to said holding means, a copyholder disposed laterally of the axis of said lens, means for bending rays from objects on said copyholder and directing them through said lens onto the sensitized material, a support on which said copyholder is movable parallel to the lens axis, inclined guiding means on which said support is movable toward and from said lens and in parallelism with the axis of said lens, graduated scales associated with said copyholder support and said copyholder for indicating respectively the correct position of the support with reference to the lens axis and the correct position of the copyholder with reference to the plane of the lens for any desired enlargement or reduction, spaced marks on said copyholder for indicating the maximum extent of the rear edge of the object thereon for a given area of sensitized material and at any particular enlargement or reduction, the distance between adjacent marks on said copyholder being equal to the total distance the object must be moved horizontally in passing from one adjustment to another minus the sum of the size of a corresponding graduation on the copyholder scale and the quotient of the vertical distance the copyholder must be moved for that adjustment divided by the cosine of the angle of inclination of the guiding means for the copyholder support.

ARTHUR W. CAPS.